(No Model.) 4 Sheets—Sheet 1.
B. F. TEAL.
FLUID PRESSURE BRAKE APPARATUS FOR CARS.
No. 538,850. Patented May 7, 1895.

(No Model.) 4 Sheets—Sheet 3.

B. F. TEAL.
FLUID PRESSURE BRAKE APPARATUS FOR CARS.

No. 538,850. Patented May 7, 1895.

Witnesses:
Fred Gerlach
Alberta Adamick

Inventor:
B. F. Teal
By Peña & Fisher
Attorneys.

(No Model.) 4 Sheets—Sheet 4.
B. F. TEAL.
FLUID PRESSURE BRAKE APPARATUS FOR CARS.
No. 538,850. Patented May 7, 1895.

Witnesses:
Fred Gerlach
Alberta Adamick

Inventor:
B. F. Teal
By Peter Fisher
Attorneys.

UNITED STATES PATENT OFFICE.

BENJAMIN FRANK. TEAL, OF CHICAGO, ILLINOIS, ASSIGNOR TO THE STANDARD VALVE COMPANY, OF SAME PLACE.

FLUID-PRESSURE BRAKE APPARATUS FOR CARS.

SPECIFICATION forming part of Letters Patent No. 538,850, dated May 7, 1895.

Application filed October 9, 1894. Serial No. 525,369. (No model.)

*To all whom it may concern:*

Be it known that I, BENJAMIN FRANKLIN TEAL, a citizen of the United States, residing at Chicago, Cook county, Illinois, have invented certain new and useful Improvements in Fluid-Pressure Brake Apparatus for Railway-Cars, of which I do declare the following to be a full, clear, and exact description, reference being had to the accompanying drawings, forming a part of this specification.

In the operation of fluid pressure brake apparatus it is found that when the brake shoes are set against the running wheels with such force as to lock the wheels against rotation, not only is the retarding effect of the wheels rendered materially less than when the rotation of the wheels is merely checked, but the sliding of the wheels upon the rails incident to their being thus locked by the action of the brake shoes speedily flattens the rims of the wheels and renders them unfit for use. It is well known that the point at which the locking of the wheels by the setting of the brake shoes occurs is dependent mainly upon the weight of the car and its load that is sustained by the wheels, and hence it is that in mixed freight trains more especially, it is impossible to determine any certain degree of air pressure that can be effectively applied in setting the brakes throughout the train, because with the loaded cars of the train a greater degree of pressure can obviously be employed without locking the wheels than would be possible with the lighter or empty cars of the train.

My present invention has primarily for its object to automatically guard against the locking of the wheels by the brake shoes when the air pressure is applied to set the brakes and this object of invention I have accomplished by the novel features hereinafter described, illustrated in the accompanying drawings and particularly pointed out in the claims at the end of this specification.

I am aware that it has been heretofore proposed to prevent the locking of the car wheels by varying the degree of pressure within the brake cylinder in correspondence to the weight of the load sustained by the wheels and I am aware also that it has been proposed to employ governing devices which, when the running wheels were locked by the brake shoes, would cause an automatic release of pressure from the brake cylinder.

In the preferred embodiment of my invention I use a centrifugal governor mounted upon one of the axles of the car (there being preferably a governor for each car of the train) and by means of this governor and suitable adjunctive mechanism I control the pressure of air within the brake cylinder so that when the pressure of air has reached such a point in the operation of setting the brakes as to reduce the rotation of the wheels below a predetermined point and below which the danger of their becoming locked would occur a release of air from the brake cylinder will take place in order to correspondingly relieve the pressure of the brake shoes upon the wheels. It will be found that certain features of my invention may be used without the adoption of the invention as an entirety. Thus for example, the centrifugal governor and its connected parts may be employed with other means for guarding against the locking of the brake shoes upon the running wheels than such as controls the release of air from the brake cylinder; and so also it will be found that the valve mechanism whereby the pressure of air within the brake cylinder is controlled may be employed in connection with other mechanism than the specific governor illustrated and hereinafter described.

Figure 1:
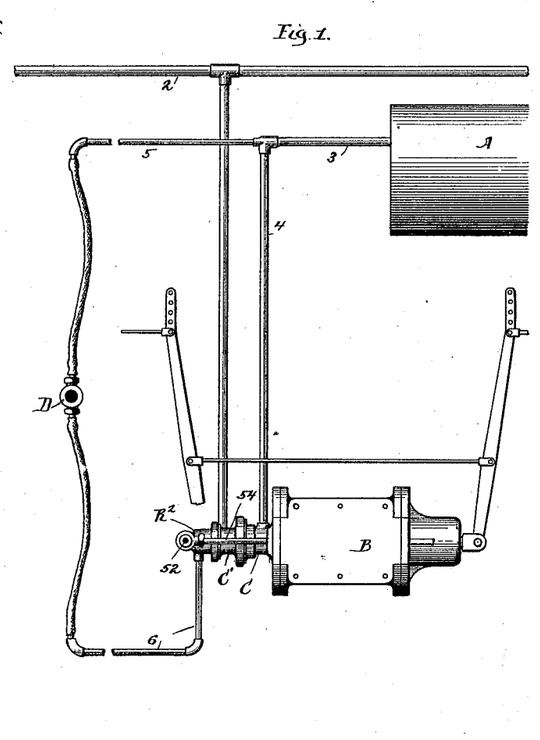
Figure 1 is a plan view of such portion of the brake apparatus beneath the car-body as is necessary to the understanding of my invention.
Figure 2:
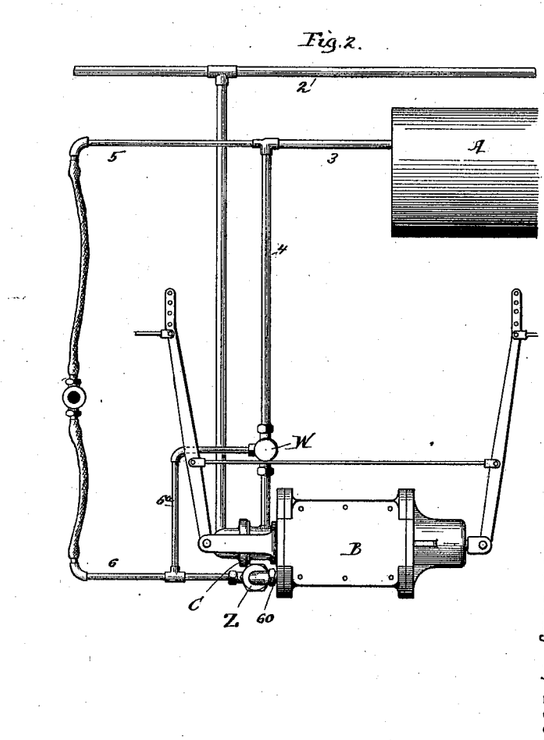
Fig. 2 is a plan view similar to Fig. 1, but showing a modified form of the invention.

Beneath the body of the car is mounted in the usual manner the auxiliary reservoir A, the brake cylinder B and train pipe 2, the auxiliary reservoir being connected by a pipe 3 and branch pipe 4 with the body of the triple valve C to which also the train pipe is connected in a manner well understood. The points at which the auxiliary reservoir and the train pipe connect with the triple valve are the same as in the familiar Westinghouse system and the triple valve employed in the form of my invention illustrated in Fig. 1 and more particularly in Figs. 7 and 8 of the drawings, is of the usual Westinghouse type with the exception of the cap of the triple valve as will be hereinafter more fully described. So also the brake levers and their connections with the brake cylinder piston are of familiar construction and need not be particularly described.

Figure 3:
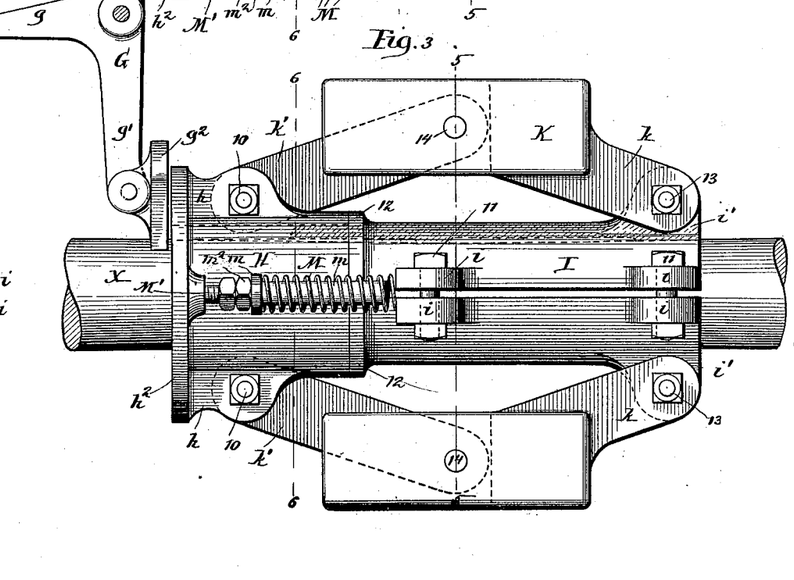
Fig. 3 is a view in elevation of part of one of the truck-axles and the governor mounted thereon.
Figure 4:
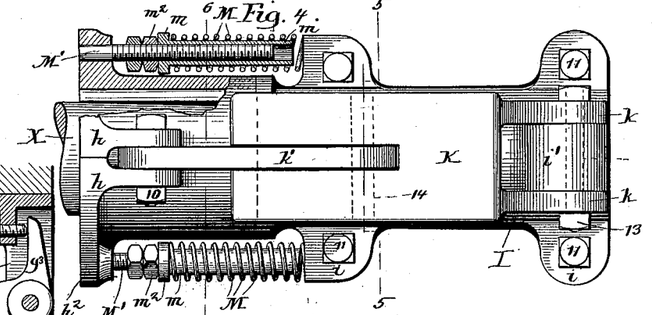
Fig. 4 is a plan view of the centrifugal governor, parts being shown in section.
Figures 5, 6:
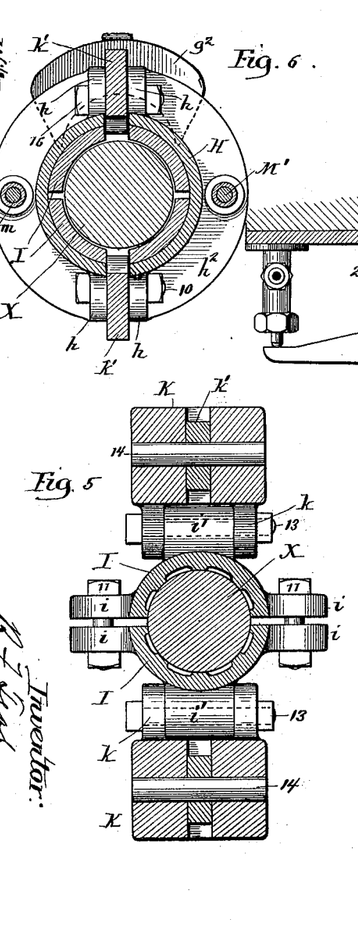
Fig. 5 is a view in vertical section on line 5 5 of Fig. 3.
Fig. 6 is a view in vertical section on line 6 6 of Fig. 4.
Figures 7, 8:
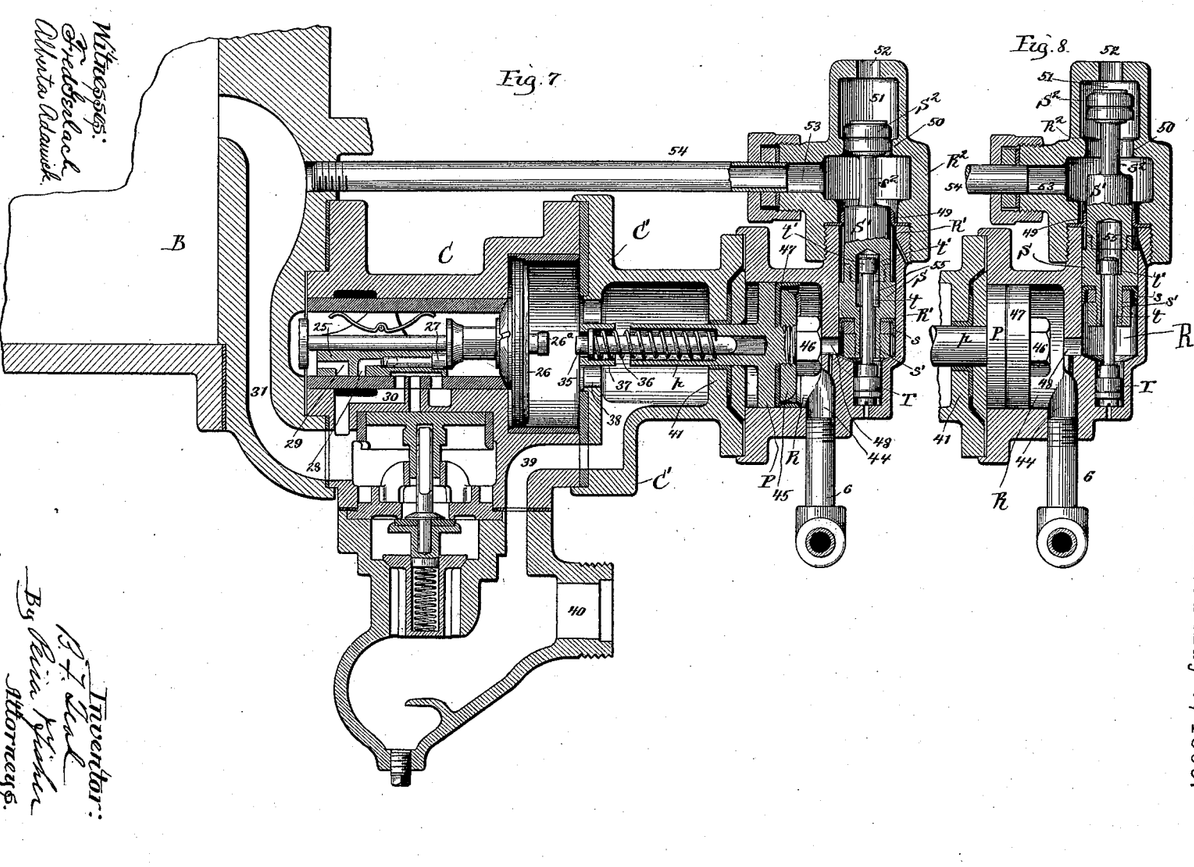
Fig. 7 is a view in vertical longitudinal section through a portion of the brake-cylinder and through the triple valve having features of my invention applied thereto.
Fig. 8 is a view in vertical section showing in different position the parts illustrated at the right-hand side of Fig. 7.
Figures 9, 10, 11, 12, 13, 14:
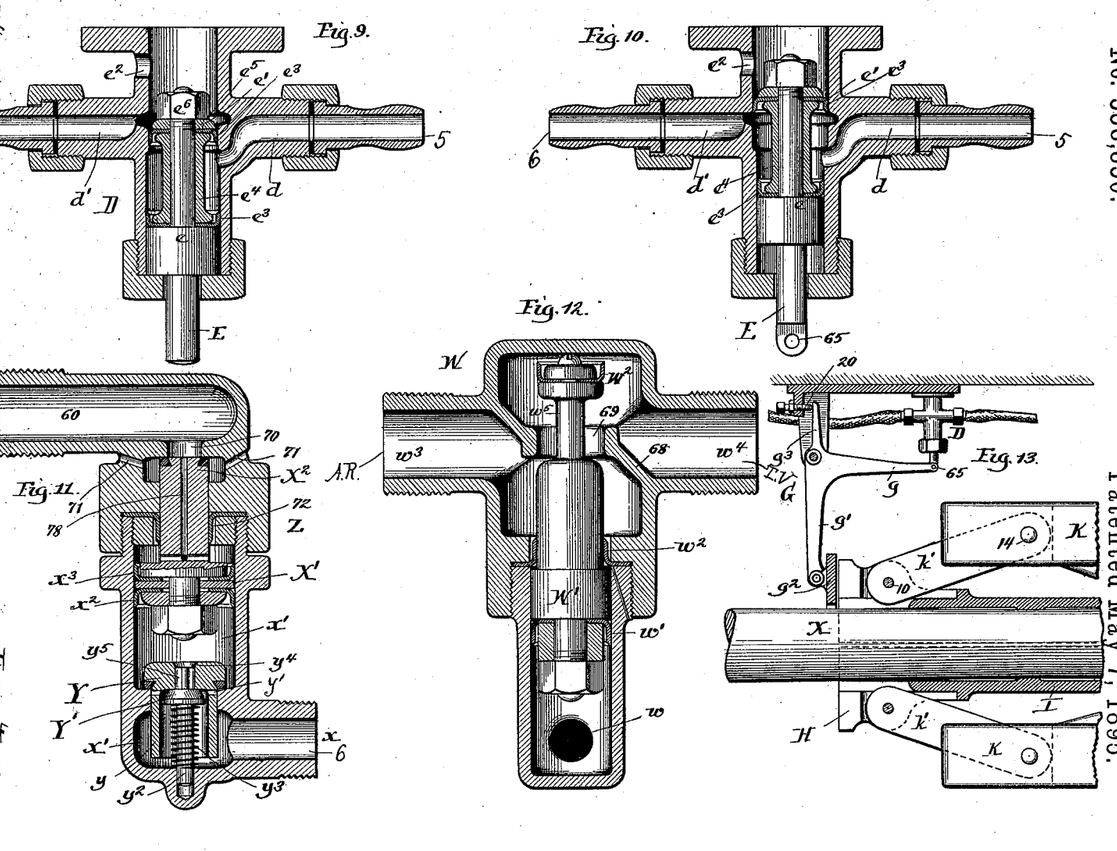
Fig. 9 is a view in vertical section through the governor-valve.
Fig. 10 is a view, similar to Fig. 9, of a modified form of the governor-valve.
Fig. 11 is a view in vertical section through the escape-valve mechanism.
Fig. 12 is a view in vertical section through the admission-valve mechanism.
Fig. 13 is a view, partly in vertical section and partly in elevation, showing the modified centrifugal governor mechanism used in connection with the governor-valve shown in Fig. 10.

In the form of my invention illustrated in Figs. 1, 7, 8 and 9 of the drawings the admission of air from the auxiliary reservoir to the brake cylinder and the release of air from the brake cylinder to the atmosphere are controlled for preventing the locking of the wheels, by means of the valve mechanism illustrated at the right-hand side of Fig. 7 and by Fig. 8, this valve mechanism being in turn controlled by a governor valve shown more particularly in Fig. 9 that is interposed in a governor pipe, the section 5 of which connects with the auxiliary reservoir and the section 6 of which pipe connects with the cap of the triple valve. The governor valve D comprises a suitable casing that is conveniently attached to a transom of the car-truck, for example as shown in Fig. 3 of the drawings, this casing being provided with ports $d$ and $d'$ connecting respectively with the auxiliary reservoir and the governor pipe 6 and through this casing extends the stem E that carries the piston $e$ and at its upper end the valve $e'$. Near the top of the casing of the governor valve is formed an escape port $e^2$ whereby air may be permitted to escape from the section 6 of the governor pipe. A suitable cup leather packing $e^3$ is preferably employed above the piston $e$ and a similar packing preferably constitutes the valve $e'$ and these packings are by preference held upon the stem E by a sleeve $e^4$, a washer $e^5$ and nut $e^6$. The normal position of the governor valve, that is to say, the position which this valve will occupy when the cars are running and the brakes are out of action, is that illustrated in Figs. 3 and 9 of the drawings; the valve-stem E, its piston $e$ and the valve $e'$ being at such time in the depressed position shown. It is by a shifting of this governor valve-stem and the valve and piston carried thereby, that the valve mechanism at the right-hand side of the triple valve shown in Figs. 7 and 8 is brought into action and to effect this shifting of the governor valve stem and parts carried thereby, I prefer to employ the centrifugal governor mechanism next to be described.

Within a suitable hanger 8 depending from the car-truck is pivotally carried a bell-crank lever G, one arm $g$ of which extends in position to engage the lower end of the governor valve-stem E while the opposite arm $g'$ extends downward and carries at its end a pivoted shoe or plate $g^2$ adapted to be engaged by a sleeve H that encircles one of the axles X of the car wheels and is movable in the direction of the length of this axle. The sleeve H is preferably formed of half-sections united together by the through-bolts 10 that pass through the lugs $h$ and this axially movable sleeve H is mounted upon the sleeve I that is firmly clamped to the axle X by means of the through-bolts 11 that pass through the lugs $i$ of the sleeve. Preferably the sleeve I is formed of sections as shown and each of these sections is provided with a flange or shoulder 12 against which the sleeve H will abut. The sleeve I is formed also with the lugs $i'$ to which are connected the arms $k$ of the governor weights K by means of the pivot-bolts 13. The weights K are preferably formed with slots as shown within which are pivoted as at 14 the arms $k'$, the opposite ends of these arms being pivotally held by the bolts 10 between the lugs $h$ of the sleeve H. Against the central lugs $i$ of the fixed sleeve I bear the coil springs M that encircle the sleeves $m$ into which pass the adjusting rods M', the outer ends of these rods being held in the flange $h^2$ of the sleeve H. By means of the rods M' and sleeve $m$, and by the nuts $m^2$ upon the rods, the pressure of the coil springs M can be adjusted as desired, the action of these springs being to thrust the sleeve H outward and draw the centrifugal weights K inward when these weights by reason of the decrease of the speed of rotation of the axle to a predetermined point are correspondingly relieved of centrifugal force incident to such rotation. When however, the axle X is rotated at a speed greater than that at which the governor is designed to act, the weights K will be moved outward by centrifugal force to the position shown in Fig. 3, thereby holding the sleeve H against the shoulder 12 of the fixed sleeve I in opposition to the force of the springs M. Preferably the bell-crank lever G is provided with a stop-arm $g^3$ that will contact with a set-screw 20 that passes through a threaded hole in the lug depending from the base-plate of the hanger arms 8 and serves to limit the rocking movement of the lever G.

By reference more particularly to Figs. 3 to 6 of the drawings it will be seen that when the car-wheels and the axle X are rotated at a speed higher than that at which the governor mechanism is designed to act the parts of the centrifugal governor will be in the position illustrated in Fig. 3 of the drawings and the stem E of the governor valve will be in the depressed position shown in Figs. 3 and 9. Inasmuch as the governor valve has no effect upon the brake mechanism so long as the stem E is in depressed position it is manifest that until the speed of rotation of the wheels is sufficiently decreased by the setting of the brakes to cause the weights K to collapse under the force of the springs M, the governor valve will remain out of action; but when the weights K of the centrifugal governor are caused to collapse the axially movable sleeve H will be thrust outward until its sleeve $h^2$ engages the shoe $g^2$ on the lower end of the bell crank lever G and so rocks this lever as to cause its arm $g$ to raise the stem E of the governor valve and bring this valve into action and cause the cutting off of the admission of air to the brake cylinder and the opening of the exhaust therefrom by the mechanism next to be described. I wish it understood however, that my improved centrifugal governor mechanism may be used in connection with other means for preventing the locking of the wheels by the brake shoes than the valve mechanism to be next described for this purpose.

The triple valve C illustrated more particularly in Fig. 7 of the drawings is of the familiar Westinghouse type with the exception of the cap C' and the valve mechanism carried thereby and the vent pipe leading to the brake cylinder, the purpose of this valve mechanism being to automatically cut off at the proper time the passage of air from the auxiliary reservoir through the triple valve to the brake cylinder and to allow the release of air from the brake cylinder in order to reduce the pressure therein to the desired degree necessary to prevent the locking of the wheels by the brake shoes. The triple valve C comprises the usual slide valve 25 and piston 26, the slide valve being provided with the familiar graduating valve 27 and with the ports 28 and 29 whereby auxiliary reservoir air is admitted from the chamber of the slide valve to a port 30 that communicates with the channel 31 leading to the brake cylinder. When the engineer desires to set the brakes, pressure will be reduced within the train pipe 2 in the usual manner, thereby causing the pressure of auxiliary reservoir air within the chamber of the slide valve 25 to force the piston 26 backward, thus shifting the graduating valve 27 and the main slide valve so as to permit passage of auxiliary reservoir air through the port 28 and by the ports 30 and 31 to the brake cylinder B. As the triple valve piston 26 is thus moved backward it will contact with the graduating stem 35 that is encircled by the graduating spring 36, the inner end of the stem 35 being sustained in the hub 37 around which air passes by the ports 38 from the channel 39 that connects by the port 40 with the train pipe 2. The operation of these familiar parts of the triple valve mechanism, as well as the parts illustrated whereby an emergency setting of the brakes will be effected will be readily understood by those familiar with the modern types of Westinghouse triple valve.

The mechanism next to be described and which forms part of my invention is designed to cut off the admission of air from the auxiliary reservoir to the brake cylinder and at the same time permit an escape of air from the brake cylinder in order to relieve the pressure of the brake shoes upon the wheels and thus prevent the locking of the wheels. Through the cap 41 of the triple valve extends the hollow stem $p$ of the cut-off piston P, this stem being bored to receive the graduating stem 35 and the coil spring 36 as shown. Preferably a packing encircles the stem $p$ in order to insure an air-tight movement of this stem through the cap of the triple valve. The piston P is held within a chamber R that communicates by a port 44 with the section 6 of the governor pipe and preferably the piston P has attached thereto, by means of a follower 45 and nut 46, a cup leather packing 47. The chamber R communicates by a port 48 with the chamber R' wherein is held the escape valve piston S, the lower part of this piston being preferably provided with a cup leather packing $s$ that is held in place by means of a nut and washer that encircle the reduced threaded portion $s'$ of the piston. The piston S is formed with a reduced upper portion S' against which bears a cup leather packing 49 that is held in place between the upper edge of the chamber R' and a shoulder formed upon its cap $R^2$. To the reduced portion S' of the piston S is attached a stem $s^2$ that carries at its upper end the escape valve $S^2$, this valve being provided with a packing to enable it to snugly fit within and close the port 50 that leads from the chamber of the cap $R^2$ to the space 51 above the escape valve $S^2$, from which chamber a port 52 opens to the atmosphere. The chamber of the cap $R^2$ is formed with a port 53 that is connected by a vent pipe 54 with the channel 31 leading to the brake cylinder B. The escape valve piston S and its reduced upper portion S' are preferably formed of separate parts threaded together as shown in Figs. 7 and 8 and provided with the chamber 55 in which moves the stem $t$ of the check piston T. The upper end of the stem $t$ is provided with the shoulder $t'$ adapted to contact with a shoulder in the chamber 55 for the purpose to be presently stated and by preference the piston T will be furnished with a cup leather to insure its snug movement within its cylinder at the base of the chamber R'.

In Fig. 7 of the drawings the parts are shown in the position occupied when the governor is out of action and in Fig. 8 the parts last described are shown in the position occupied when the governor is in the act of releasing air from the brake cylinder. If now it is desired to set the brakes the pressure of air within the train pipe will be reduced and the slide valve 25 and the piston 26 of the triple valve will be shifted in the usual manner so as to permit auxiliary reservoir air to pass by the ports 28, 30 and 31 to the brake cylinder thereby shifting the piston of this cylinder to effect the application of the brakes. When the piston 26 of the triple valve is thus moved outward its stem $26^a$ will contact with the graduating stem 35 and when train pipe pressure has been sufficiently reduced to cause full or nearly full brake action the stem 35 will be forced backward against the spring 36 in the usual manner.

Assuming that the speed of rotation of the axle X is sufficiently great to hold the weights K of the centrifugal governor in the outward position shown in Fig. 3, it will be seen by reference more particularly to Figs. 3 and 9 of the drawings that at such time the pressure of air from the auxiliary reservoir acting upon the upper face of the governor piston $e$ will hold this piston in depressed position shown, and this action is rendered possible because the upper end of the piston $e$ exposes a slightly greater area to the action of reservoir air than does the lower face of the check valve $e'$, the diameter of the piston being slightly larger than that of such valve. While the governor piston $e$ and the valve $e'$ are in the position shown in Fig. 9 the section 6 of the governor pipe is in free communication with the atmosphere. Consequently there will be no air pressure within the chambers R and R' of the triple valve. When however, the pressure of the brakes upon the running wheels has so reduced the speed of rotation of the wheels as to cause the weights K of the governor to collapse under the action of the springs M the inward movement of these weights and of the arms attached thereto will cause the sleeve H to be shifted, thereby rocking the bell-crank lever G about its pivot point and causing its arm $g$ to raise the piston E of the governor valve D. This inward movement of the weights K of the centrifugal governor will occur when the speed of the running wheels is reduced to such point as to interfere with their effective brake action or as to endanger their becoming locked by the brake shoes. When the stem E of the governor valve is thus raised the valve $e'$ will cut off communication between the section 6 of the governor pipe and the atmosphere through the port $e^2$ and will establish communication by ports $d$ and $d'$ from the auxiliary reservoir through the sections 5 and 6 of the governor pipe to the chamber R at the right-hand side of the triple valve casing. Auxiliary reservoir air will thus pass through the governor valve casing and by the port 44 into the chamber R and will force the cut-off piston P to the left as seen in Fig. 8, thereby compressing the graduating spring 36 and so increasing its force as to cause the stem 35 to shift the triple valve piston 26 and the graduating valve 27 and thereby without disturbing the position of the slide valve will cause the graduating valve 27 to cut off admission of air from the auxiliary reservoir into the channel 28 and consequently to the brake cylinder. The auxiliary reservoir air thus admitted by the governor pipe 6 and port 44 to the chamber R will pass by the port 48 into the chamber R' beneath the piston S thereby lifting this piston until the escape valve $S^2$ at its upper end passes from engagement with the seat 50, thus permitting air to escape from the brake cylinder by the vent pipe 54, port 53, chamber $R^2$ and port 52 to the atmosphere. The extreme upward movement of the escape valve $S^2$ is resisted by the pressure of auxiliary reservoir air passing by port 48 into chamber R' and acting upon the upper face of the stop-piston T against the shoulder $t'$ of the stem and against which piston the escape valve piston S will check in its initial upward movement before the escape valve $R^2$ closes the escape port 52 and the upward movement of this escape valve is resisted also by the pressure of air from the brake cylinder upon the upper portion S' of the escape valve piston. It is manifest however, that as soon as the pressure of air within the brake cylinder is reduced to such extent that by acting upon the upper end of the portion S' of the escape valve piston it no longer sufficiently aids the check piston T in resisting the upward movement of the escape valve piston, then the pressure beneath the piston S will cause it to complete its upward movement and cause the escape valve $S^2$ to close the port 52 and thus cut off further escape of air from the brake cylinder. Hence it will be seen that when the speed of the running wheels is so far decreased by the application of the brakes as to endanger the locking of the wheels, the governor mechanism hereinbefore described will not only cut off further admission of air from the auxiliary reservoir to the brake cylinder but will allow sufficient escape of air from this cylinder to reduce the brake cylinder pressure to a point at which the possibility of the locking of the wheels is avoided.

When pressure is restored in the train pipe to release the brakes the main piston and slide valve of the triple valve will be brought to the release position in the usual manner so as to permit the escape of air from the brake cylinder through the release ports of the triple valve. The parts of the governing mechanism will remain in the position to which they have been brought by the checking of the rotation of the axle until the speed of the axle is so increased as to restore the governor weights to the position shown in Fig. 3 of the drawings. When the arms are in this position, the sleeve attached to the weighted arms will be withdrawn so as no longer to act upon the bell-crank lever. Consequently the excess pressure of air from the auxiliary reservoir upon the upper face of the governor valve piston $e$ will force this piston downward until it is stopped by the contact of the check-screw 20 that engages the projecting arm $g^3$ of the bell-crank lever G. This downward movement of the governor valve piston is due to the fact that the area of the upper face of the piston $e$ is somewhat greater than the area of the under side of the escape valve $e'$ above this piston as before explained. When the governor valve piston $e$ is thus in depressed position communication between the auxiliary reservoir and the triple valve through the ports $d$, $d'$ and governor valve is cut off and the section 6 of the governor pipe that leads to the triple valve is brought into communication with the atmosphere through the escape port $e^2$ of the governor valve casing thereby releasing pressure within the cap of the triple valve. When pressure is thus released within the cap of the triple valve the pressure of train pipe air upon the stem $p$ of the piston P within the cap will force this piston backward to the position seen in Fig. 7. Immediately upon the admission of air into the brake cylinder for the setting of the brakes the pressure of cylinder air passing from the vent pipe 54 onto the upper end of the check valve piston S' will force this piston downward thereby restoring the parts to the position seen in Fig. 7 and thus cutting off the escape of air from the brake cylinder through vent pipe 54 and port 52.

In the modified form of the invention illustrated in Figs. 2 and 10 to 13 of the drawings the triple valve will be of the usual Westinghouse type, without modification whatever. In this form of the invention the triple valve C is connected with the auxiliary reservoir A by the pipes 3 and 4 and in the pipe 4 is interposed an admission valve W forming part of my invention. Into the brake cylinder is tapped an escape pipe 60 to which is connected an escape valve Z also embodying part of my invention and both the escape valve and the admission valve last referred to are connected to the section 6 of the pipe that leads from the governing valve, the piston side of this governing valve being connected by pipe section 5 with the auxiliary reservoir as in the construction above described. A branch pipe $6^a$ connects the section 6 of the governor valve with a port $w$ at the base of the admission valve casing W. In this modified form of my invention the normal position of the parts of the governor valve D is as shown in Fig. 10 of the drawings (being the reverse of that shown in Fig. 9); that is to say, when the weights K of the centrifugal governor are in their outward position as seen in Fig. 13 the piston-stem E of the governor valve is raised so that the valve $e'$ cuts off the escape of air from the section 6 of the governor pipe through the port $e^3$ of the governor valve casing and allows free passage of air from the auxiliary reservoir, by the ports $d$ and $d'$ of the governor valve casing between the two sections 5 and 6 of the governor pipe. In order to hold the parts in the position shown in Fig. 10 the area of the upper face of the governor valve piston $e$ will be somewhat smaller than the area of the under side of the valve $e'$ and the excess pressure exerted upon the under side of the valve $e'$ will serve to hold the valve in normally raised position as shown. In this form of the invention the stem E of the governor valve is preferably connected as at 65 to the arm $g$ of the bell-crank lever G, the lower arm $g'$ of this lever being provided with the pivot shoe $g^2$ as in the construction hereinbefore described. So also the bell-crank lever will be provided with a stop-arm $g^3$ to be engaged by the adjusting screw 20 as in the form of my invention before described and the centrifugal governor will be identical in construction with that already set forth. Inasmuch as the normal position of the governor valve D is that shown in Fig. 10 of the drawings it is obvious that when the parts are in normal position, at which time the weights of the centrifugal governor are in the outward position seen in Fig. 13, air will pass freely through the casing of the governor valve D from the auxiliary reservoir to the port $x$ at the base of the release valve casing Z and by the branch pipe $6^a$ to the port $w$ at the base of the casing of the admission valve W. Within the casing of the admission valve W is the admission valve piston W' preferably provided with a cup leather packing $w'$ and the reduced upper part of this piston W' is encircled by a packing $w^2$ that is clamped between the upper and lower threaded sections of the valve casing as shown in Fig. 12. Across the upper chamber of the admission valve casing W extends a wall or diaphragm 68 in which is formed the port 69 by means of which air will pass between the ports $w^3$ and $w^4$ of the casing. The stem $w^5$ of the admission valve piston W' carries the valve $W^2$ that is preferably provided with a cup leather packing as shown, this valve serving to close the port 69 when the admission of air from the auxiliary reservoir to the triple valve is to be cut off. The escape valve casing Z is formed with a chamber $x'$ at the base of which is mounted a check valve Y that seats as shown against the bottom of the chamber $x'$. Through the bottom of this chamber $x'$ extends the depending trunk $y$ of the valve Y, this trunk being preferably formed with perforations $y'$, the purpose of which will presently appear, and beneath the valve Y is mounted a supplemental check valve Y' the stem $y^2$ of which is held in a manner free to move within a seat at the bottom of the casing and is encircled by a coil spring $y^3$ that forces the valve Y' normally upward so as to cause it to close the port $y^4$ in the valve Y, and preferably the stem $y^2$ of the valve Y' has an extended upper portion $y^5$ forming wings to guide the valve and at the same time permit the passage of air through the port $y^4$ when the valve Y' is depressed. Within the upper part of the chamber $x'$ is held the escape valve piston X' preferably provided with the cup leather packing rings $x^2$ and $x^3$ and the upper end of this piston serves as a valve $X^2$ to close the port 70 whereby air is allowed to pass from the escape pipe 60 to the escape ports 71 in the upper part of the escape valve casing Z. Preferably the stem of the escape valve piston $X^2$ is encircled by a packing ring 72 that is held in place between the upper and lower threaded portions of the escape valve casing as shown in Fig. 11.

In the normal position of the parts, the weights K of the centrifugal governor being in the outward position shown in Fig. 13 of the drawings, the parts of the governor valve will be in the position seen in Fig. 10 and at such time air will pass freely through the casing of this valve from the auxiliary reservoir by the pipe 6 and branch pipe $6^a$ to the under side of the admission valve piston W and auxiliary reservoir air will also pass by pipe section 6 and port $x$ to the bottom of the escape valve casing X and lifting the valve Y will enter the chamber $x'$ and will hold the escape valve piston X' in the position shown in Fig. 11 so as to cause the escape valve $X^2$ to close the port 70 and thus prevent the escape of air from the brake cylinder through the pipe 60. Hence it will be seen that under such conditions auxiliary reservoir air can pass through the admission valve casing W, the admission valve being held normally open and the release valve $X^2$ will be held normally closed so as to guard against the escape of air from the brake cylinder. If now it is desired to set the brakes, pressure within the train pipe 2 will be reduced in the usual manner and air can pass freely from the auxiliary reservoir by pipes 3 and 4 to the triple valve and brake cylinder and will continue thus to pass until the speed of the running wheels is so decreased by the action of the brake shoes that the governor weights K are caused to collapse. As soon as these weights are thus moved inward the sliding sleeve H will engage the lower arm of the bell-crank lever causing this arm to swing outward and consequently draw downward the stem E of the governor valve piston until the valve $e'$ cuts off communication between the ports $d$ and $d'$ and opens communication between the port $d'$ and the port $e^2$. This shifting of the stem E of the governor valve will thus cut off the passage of air from the auxiliary reservoir to the supplemental cut-off piston, and inasmuch as air is allowed to escape from the section 6 of the governor pipe and consequently from beneath the valve Y of the release valve casing X, the pressure of air within the chamber $x'$ of this casing will force downward the check valve Y' and allow a portion of the air to escape from the chamber $x'$ into the open section 6 of the governor pipe. At the same time the back pressure of air from the brake cylinder B passing through the pipe 60 and through the port 78 of the stem of the escape valve $X^2$ onto the upper face of the piston X' (see Fig. 11), will force the piston X' downward until the valve $X^2$ uncovers the port 70 and permits air to escape from the brake cylinder by the pipe 60, port 70 and port 71 to the open air. It will thus be seen that when the speed of rotation of the car wheels has been so far reduced as to endanger the locking of the wheels by the brake shoes, not only will the admission of auxiliary reservoir air to the brake cylinder through the triple valve be cut off but an escape of air from the brake cylinder will be effected. The force of the coil spring $y^2$ beneath the check valve $Y^2$ is such that when the pressure within the chamber $x'$ has reached a predetermined point of reduction the check valve Y' will close the port $y^4$ of the valve Y thus arresting further escape of air from the chamber $x'$. The confined air within the chamber $x'$ will by its expansion raise the piston X' and thus cause the escape valve $X^2$ to close the port 70 as soon as brake cylinder pressure on the upper face of piston X' and valve $X^2$ has fallen below the pressure in chamber $x'$. Hence it is that while such excess of pressure within the brake cylinder as will endanger the locking of the wheels is avoided, an adequate pressure can at all times be retained within the cylinder to set the brakes with sufficient force to check the wheels under reduced speed of rotation or at a stand-still upon a down grade.

The centrifugal governor mechanism and the admission and escape valve mechanism will remain in the positions last described until the brakes have been released and the speed of the axle has been so increased as to cause the weights of the governor to again move to the outward position shown in Fig. 13 of the drawings. When the weights are thus moved outward the sleeve H will be retracted and the bell-crank lever will be restored to the position shown in Fig. 12 as the governor valve stem E is raised by the pressure of auxiliary reservoir air upon the under side of the valve $e'$, the area of this valve being greater than the area of the upper end of the piston $e$. When the parts of the governor valve are thus restored to normal position seen in Fig. 10 air will again pass from the auxiliary reservoir between the sections 5 and 6 of the governor pipe, to the bottom of the escape valve casing Z and by the pipe $6^a$ to the bottom of the admission valve casing W. The air thus admitted to the bottom of the escape valve casing Z will lift the check valve Y and passing into the chamber $x'$ will again charge this chamber with reservoir pressure, while reservoir air passing beneath the admission valve piston W' will raise this piston thereby causing the valve $W^2$ to open the port 69 and again permit free passage of air from the auxiliary reservoir to the triple valve.

Having thus described the invention, what I claim as new, and desire to secure by Letters Patent, is—

1. In a fluid pressure brake apparatus, the combination with a truck axle, of a centrifugal governor mounted thereon, comprising a sleeve fixed to the axle, a radially movable weight or weights connected to said sleeve, an axially movable sleeve loosely mounted upon said fixed sleeve and arranged to be shifted by said weight or weights and adjustable spring mechanism for acting upon said movable sleeve in opposition to said weight or weights.

2. In a fluid pressure brake apparatus, the combination with an auxiliary reservoir, a brake cylinder and a triple valve mechanism connected with said brake cylinder, of a governor valve mechanism for controlling the passage of air from the auxiliary reservoir into the brake cylinder, said governor valve mechanism having a projecting stem, a lever having one end engaged with the projecting stem of the governor valve mechanism and a centrifugal governor mounted upon a truck axle and having an axially movable part arranged in position to engage the opposite end of said lever whereby the stem of the governor valve mechanism is shifted.

3. In a fluid pressure brake apparatus, the combination with an auxiliary reservoir, a brake cylinder, and a triple valve for normally effecting the admission and escape of air to and from the brake cylinder, of supplemental valve mechanism for controlling the admission of auxiliary reservoir air to the brake cylinder by way of the triple valve, a supplemental escape passage from the brake cylinder independent of the triple valve, a valve mechanism for controlling the escape of air from the brake cylinder through said supplemental passage, and a governor valve for actuating said supplemental admission valve mechanism and said valve mechanism whereby the escape of air from the brake cylinder by the supplemental passage is effected.

4. In a fluid pressure brake apparatus, a governor valve comprising a casing having ports $d$ and $d'$ and escape port $e^2$ and comprising also a cylinder $e$ having a stem E projecting outside the casing and having an escape valve $e'$ for controlling communication between the ports $d$, $d'$ and between the port $d'$ and the escape port $e^2$.

5. In fluid pressure brake apparatus, the combination with a reservoir, of a governor valve interposed in a pipe connected with said reservoir, the casing of said governor valve being provided with an escape port and with ports whereby reservoir air may pass through said casing and comprising also a piston and an escape valve within said casing exposing unequal areas to reservoir pressure.

6. In a fluid pressure brake apparatus, the combination with a reservoir, a train pipe, a brake cylinder and a triple valve for normally controlling the admission of air from the auxiliary reservoir to the brake cylinder, of a cut-off piston for preventing the passage of reservoir air through the triple valve, a supplemental release passage leading from the brake cylinder and a supplemental check valve and piston independent of the triple valve for controlling the passage of air from the brake cylinder.

7. In a fluid pressure brake apparatus, the combination with a reservoir, a train pipe, a brake cylinder, and a triple valve having a slide valve, a main piston with suitable ports or channels for the admission and escape of air to and from the brake cylinder, of a supplemental cut-off piston for shifting the main piston of the triple valve, a cylinder for said supplemental piston, an independent connection between said supplemental cylinder and the auxiliary reservoir and a governor valve for controlling the flow of air to said supplemental cylinder whereby when air is admitted to said supplemental cylinder the supplemental piston will shift the main piston and cut off the passage of reservoir air through the triple valve.

8. In a fluid pressure brake apparatus, the combination with the auxiliary reservoir, the brake cylinder and the triple valve having a slide valve and a main piston, of a cut-off piston independent of the triple valve mechanism, a cylinder for said cut-off piston, an independent air supply pipe connected to the cylinder of the said cut-off piston, a graduating stem and spring for said slide valve and a stem for the cut-off piston engaging the graduating spring and adapted to compress said spring to effect the shifting of the main piston of the triple valve.

9. In a fluid pressure brake apparatus, the combination with the auxiliary reservoir, the brake cylinder and the triple valve and its main piston and slide valve and its graduating spring and stem, of a cut-off piston, a cylinder for said piston, a hollow stem for said piston encircling the stem and graduating spring of the triple valve and an independent pipe for admitting reservoir air to said cut-off piston and a governor valve for controlling the passage of air to the cylinder of said cut-off piston.

10. In a fluid pressure brake apparatus, the combination with the brake cylinder and with the triple valve mechanism for controlling the admission and escape of air to and from said cylinder, of a supplemental vent passage leading from said cylinder, an escape valve for controlling the flow of air through said vent passage, a supplemental piston for operating said escape valve having one side exposed to cylinder pressure and having its other side exposed to air pressure in opposition to cylinder pressure whereby when the cylinder pressure is reduced below a certain point the piston will shift to cut-off the further escape of air from the brake cylinder.

11. In a fluid pressure brake apparatus, the combination with the brake cylinder and with the triple valve for controlling the admission and escape of air to and from said cylinder, of a supplemental escape passage from said cylinder, a supplemental valve for controlling said escape passage, a piston for said supplemental valve exposed on one side to cylinder pressure and upon its other side to pressure in opposition to said cylinder pressure, and a check piston, the stem of which is in position to engage said escape valve piston and limits its movement until the brake cylinder pressure is reduced to a predetermined point.

B. FRANK. TEAL.

Witnesses:
GEO. P. FISHER, Jr.,
ALBERTA ADAMICK.